(12) United States Patent
Lakaniemi et al.

(10) Patent No.: US 7,796,626 B2
(45) Date of Patent: Sep. 14, 2010

(54) SUPPORTING A DECODING OF FRAMES

(75) Inventors: Ari Lakaniemi, Helsinki (FI); Pasi S. Ojala, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 870 days.

(21) Appl. No.: 11/528,488

(22) Filed: Sep. 26, 2006

(65) Prior Publication Data

US 2008/0092019 A1    Apr. 17, 2008

(51) Int. Cl.
*H04L 12/56* (2006.01)
(52) U.S. Cl. .................. 370/414; 704/503; 704/278
(58) Field of Classification Search ........ None
See application file for complete search history.

(56) References Cited

U.S. PATENT DOCUMENTS

| | | | |
|---|---|---|---|
| 5,588,029 A | 12/1996 | Maturi et al. | |
| 6,377,931 B1 * | 4/2002 | Shlomot | 704/503 |
| 6,859,460 B1 | 2/2005 | Chen | |
| 7,266,127 B2 * | 9/2007 | Gupta et al. | 370/413 |
| 2002/0154823 A1 * | 10/2002 | Okada | 382/233 |
| 2006/0056383 A1 * | 3/2006 | Black et al. | 370/350 |
| 2007/0086343 A1 * | 4/2007 | Kujawa et al. | 370/235 |

FOREIGN PATENT DOCUMENTS

| | | |
|---|---|---|
| EP | 1 536 582 | 6/2005 |
| WO | 01/93516 | 12/2001 |

OTHER PUBLICATIONS

International Application No. PCT/IB2007/053756, Form PCT/ISA/220 (2 pages) dated Mar. 17, 2008 with Form PCT/ISA/210 (3 sheets) and Form PCT/ISA/237 (6 pages) Transmitting International Search Report and Written Opinion of the International Searching Authority (EPO).
3GPP TS 26.191 V6.0.0 (Dec. 2004) "3rd Generation Partnership Project; Technical Specification Group Services and System Aspects; Speech codec speech processing functions; Adaptive Multi-Rate—Wideband (AMR-WB) speech codec; Error concealment of erroneous or lost frames (Release 6)".

* cited by examiner

*Primary Examiner*—Phuc Tran

(57) ABSTRACT

For supporting a decoding of encoded frames, which belong to a sequence of frames received via a packet switched network, it is detected whether a particular encoded frame has been received after a scheduled decoding time for the particular encoded frame and before a scheduled decoding time for a next encoded frame. In case the particular encoded frame is detected to have been received after its scheduled decoding time and before the scheduled decoding time for the next encoded frame, the particular encoded frame is re-scheduled to be decoded at the scheduled decoding time for the next encoded frame.

31 Claims, 3 Drawing Sheets

SUPPORTING A DECODING OF FRAMES

FIELD OF THE INVENTION

The invention relates to the support of a decoding of frames, which belong to a sequence of frames and which are received via a packet switched network.

BACKGROUND OF THE INVENTION

Encoded frames may be transmitted from a transmitter to a receiver via a packet switched network, such as the Internet.

For a transmission of voice, for example, speech frames may be encoded at a transmitter, transmitted via a packet switched network, and decoded again at a receiver for presentation to a user. During periods when the transmitter has no active speech to transmit, the normal transmission of speech frames may be switched off. The transmitter may generate during these periods a set of comfort noise parameters describing the background noise that is present at the transmitter. These comfort noise parameters may be sent to the receiver in additional silence descriptor (SID) frames. The receiver may then use the received comfort noise parameters to synthesize an artificial, noise-like signal having characteristics close to those of the background noise present at the transmitter.

The nature of packet switched communications typically introduces variations to the transmission times of the packets, known as jitter, which is seen by the receiver as packets arriving at irregular intervals. In addition to packet loss conditions, network jitter is a major hurdle especially for conversational speech services that are provided by means of packet switched networks.

More specifically, an audio playback component of an audio receiver operating in real-time requires a constant input to maintain a good sound quality. Even short interruptions should be prevented. Thus, if some packets comprising audio frames arrive only after the audio frames are needed for decoding and further processing, those packets and the included audio frames are considered as lost due to a too late arrival. The audio decoder will perform error concealment to compensate for the audio signal carried in the lost frames. Obviously, extensive error concealment will reduce the sound quality as well, though.

Typically, a jitter buffer is therefore utilized to hide the irregular packet arrival times and to provide a continuous input to the decoder and a subsequent audio playback component. The jitter buffer stores to this end incoming audio frames for a predetermined amount of time. This time may be specified for instance upon reception of the first packet of a packet stream. A jitter buffer introduces, however, an additional delay component, since the received packets are stored before further processing. This increases the end-to-end delay.

A jitter buffer, from which frames are extracted with a fixed rate due to a fixed decoding timing, is inevitably a compromise between a low end-to-end delay and a low amount of delayed frames, and finding an optimal tradeoff is not an easy task. Although there can be special environments and applications where the amount of expected jitter can be estimated to remain within predetermined limits, in general the jitter can vary from zero to hundreds of milliseconds—even within the same session. Using a fixed decoding timing with the initial buffering delay that is set to a sufficiently large value to cover the jitter according to an expected worst case scenario would keep the amount of delayed frames in control, but at the same time there is a risk of introducing an end-to-end delay that is too long to enable a natural conversation. Therefore, applying a fixed buffering scheme is not the optimal choice in most audio transmission applications operating over a packet switched network, for example in Voice over Internet Protocol (VoIP) over the 3GPP IP Multimedia Subsystem (IMS).

An adaptive jitter buffer management can be used for dynamically controlling the balance between a sufficiently short delay and a sufficiently low amount of delayed frames. In this approach, the incoming packet stream is monitored constantly, and the buffering delay is adjusted according to observed changes in the delay behavior of the incoming packet stream. In case the transmission delay seems to increase or the jitter is getting worse, the buffering delay is increased to meet the network conditions. In an opposite situation, the buffering delay can be reduced, and hence, the overall end-to-end delay is minimized.

The buffering delay modifications can be done for example by adding error concealment frames between received speech frames or by removing speech frames. Buffering delay modifications using such frame insertion/removing is most beneficial during inactive speech. Alternatively, the jitter buffer management may use time scaling to modify the speech frame duration, and hence, adapt the buffering delay.

One of the challenges in adaptive jitter buffer management is the reliable prediction of the transmission characteristics. Although a jitter buffer adaptation based on the reception statistics of most recent packets usually gives a reasonable estimate on the short-term network behavior, it is not possible, at least when applying a relatively strict buffering delay requirement, to avoid that some frames arrive after their scheduled decoding time, that is, too late for normal decoding. It might be desirable to adapt to an increasing delay for example by using time scaling to increase the buffering time before any frames arrive late, but this is not always possible in practice.

In a particularly simple approach, frames arriving after their scheduled decoding time may be discarded and considered as lost frames. In this case, an error concealment operation will replace the missing voice data.

In a more advanced approach, a "late frame processing" may be applied. In this approach, a late-arriving frame is used to update the internal state of the decoder, although the speech corresponding to this late-arriving frame has already been replaced by an error concealment operation. Using the late-arriving frame to update the state of the decoder to match the corresponding state of the encoder provides a quality benefit, since the error concealment operation is not able to update the decoder's internal state in a correct manner. Frames that are decoded based on a mismatching decoder state typically result in somewhat decreased voice quality also in correctly received frames following the one replaced by the error concealment operation.

SUMMARY

The invention proceeds from the consideration that the mentioned "late frame processing" is computationally very complex. Further, when considering the practical implementation of an adaptive jitter buffer, a late-arriving frame indicates in many cases that the buffering delay is too short, for example due to a changing transmission delay or due to changing jitter conditions. Thus, although the mentioned "late frame processing" might be useful in mitigating the negative effect on quality caused by late-arriving frames, it does not correct the source of the problem, since it is likely that many of the subsequent frames will also arrive after their scheduled decoding time, if the buffering time is not increased by delaying the decoding of subsequent frames.

A method is disclosed, which comprises detecting whether a particular encoded frame, which belongs to a sequence of frames and which has been received via a packet switched network, has been received after a scheduled decoding time for the particular encoded frame and before a scheduled decoding time for a next encoded frame in the sequence of frames. The method further comprises re-scheduling the particular encoded frame to be decoded at the scheduled decoding time for the next encoded frame, in case the particular encoded frame is detected to have been received after its scheduled decoding time and before the scheduled decoding time for the next encoded frame.

Moreover, an apparatus is disclosed, which comprises a processing component. The processing component is configured to detect whether a particular encoded frame, which belongs to a sequence of frames and which has been received via a packet switched network, has been received after a scheduled decoding time for the particular encoded frame and before a scheduled decoding time for a next encoded frame in the sequence of frames. The processing component is further configured to re-schedule the particular encoded frame to be decoded at the scheduled decoding time for the next encoded frame, in case the particular encoded frame is detected to have been received after its scheduled decoding time and before the scheduled decoding time for the next encoded frame.

The processing component may be implemented in hardware and/or software. It could be realized for example in the form of a processor executing corresponding program code, in the form of a chip, like in integrated circuit, or in the form of a more comprehensive device, like an audio receiver, an audio transceiver, or a buffering component, etc.

Moreover, an electronic device is disclosed, which comprises the disclosed apparatus and, in addition, a user interface, like a loudspeaker or an interface to speakers.

Moreover, a system is disclosed, which comprises the disclosed apparatus and in addition a further apparatus. The further apparatus comprises a processing component configured to provide a sequence of encoded frames for transmission via a packet switched network.

Finally, a computer program product is disclosed, in which a program code is stored in a computer readable medium. The program code realizes the disclosed method when executed by a processor.

The computer program product could be for example a separate memory device, or a memory that is to be integrated in an electronic device.

The invention is to be understood to cover such a computer program code also independently from a computer program product and a computer readable medium.

Instead of simply discarding a late-arriving frame or of using a late-arriving frame only for updating an internal state of a decoder, it is thus shown that a late-arriving frame may be provided for decoding at the next decoding instance, if it arrives in time for this next decoding instance.

The invention allows providing a reasonable quality of decoded data while enabling a very simple implementation. A computationally complex "late frame processing" can thereby be avoided. Further, the invention can be used with a conventional decoder, which does not have to be modified as in the case of the "late frame processing" approach.

In one embodiment, re-scheduling a particular encoded frame implies that a scheduled decoding time for all subsequently received encoded frames of the sequence of frames is re-scheduled as well. That is, the decoding time is set back for all subsequent encoded frames by one decoding instance.

In one embodiment, content of the particular encoded frame is replaced by an error concealment operation at the scheduled decoding time for the particular encoded frame, in case the particular encoded frame is detected to have been received after the scheduled decoding time for the particular encoded frame. That is, error concealment functionality is used to create an additional signal between a preceding encoded frame and the particular encoded frame.

In one embodiment, the particular encoded frame is discarded without decoding, in case it is detected that the particular encoded frame has been received after the scheduled decoding time for the particular encoded frame and after the scheduled decoding time for the next encoded frame. In this case, an error concealment operation may be used to create an additional signal between an encoded frame preceding the particular encoded frame and an encoded frame following upon the particular encoded frame.

Instead of simply discarding such a particular encoded frame, which arrives even too late for the scheduled decoding time for the next encoded frame, it would also be possible to use it as soon as it arrives for updating the internal state of the decoder to match the corresponding state of the employed encoder, similarly as in the above mentioned "late frame processing" approach.

In one embodiment, the particular encoded frame is re-scheduled only, in case the next encoded frame is detected not to have been received before the scheduled decoding time for the next encoded frame. Otherwise, the particular encoded frame is discarded without decoding, and it may be considered as a frame lost on the transmission link. Again, instead of simply discarding the particular encoded frame, it could be used as well for updating the internal state of the decoder to match the corresponding state of the encoder.

In one embodiment, the received encoded frames are buffered in a jitter buffer at least until their scheduled decoding time. The scheduled decoding times may be adaptive.

However, the invention even allows dispensing with a time scaling functionality, which is required for adaptive jitter buffering. While a time scaling functionality can be considered useful in general, it may not be applicable in some cases, which require a particularly simple overall implementation. In another embodiment, the received encoded frames may thus be buffered in a jitter buffer at least until their scheduled decoding time, wherein the scheduled decoding times are fixed.

In one embodiment, the encoded frames are encoded audio frames, like encoded speech frames. It is to be understood, however, that the invention can be used with frames comprising any other type of data as well.

The invention can be employed for any codec using a jitter buffer at a receiving side. Examples are the AMR codec or the AMR-WB codec used for VoIP.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the

DETAILED DESCRIPTION OF THE INVENTION

Figure 1:
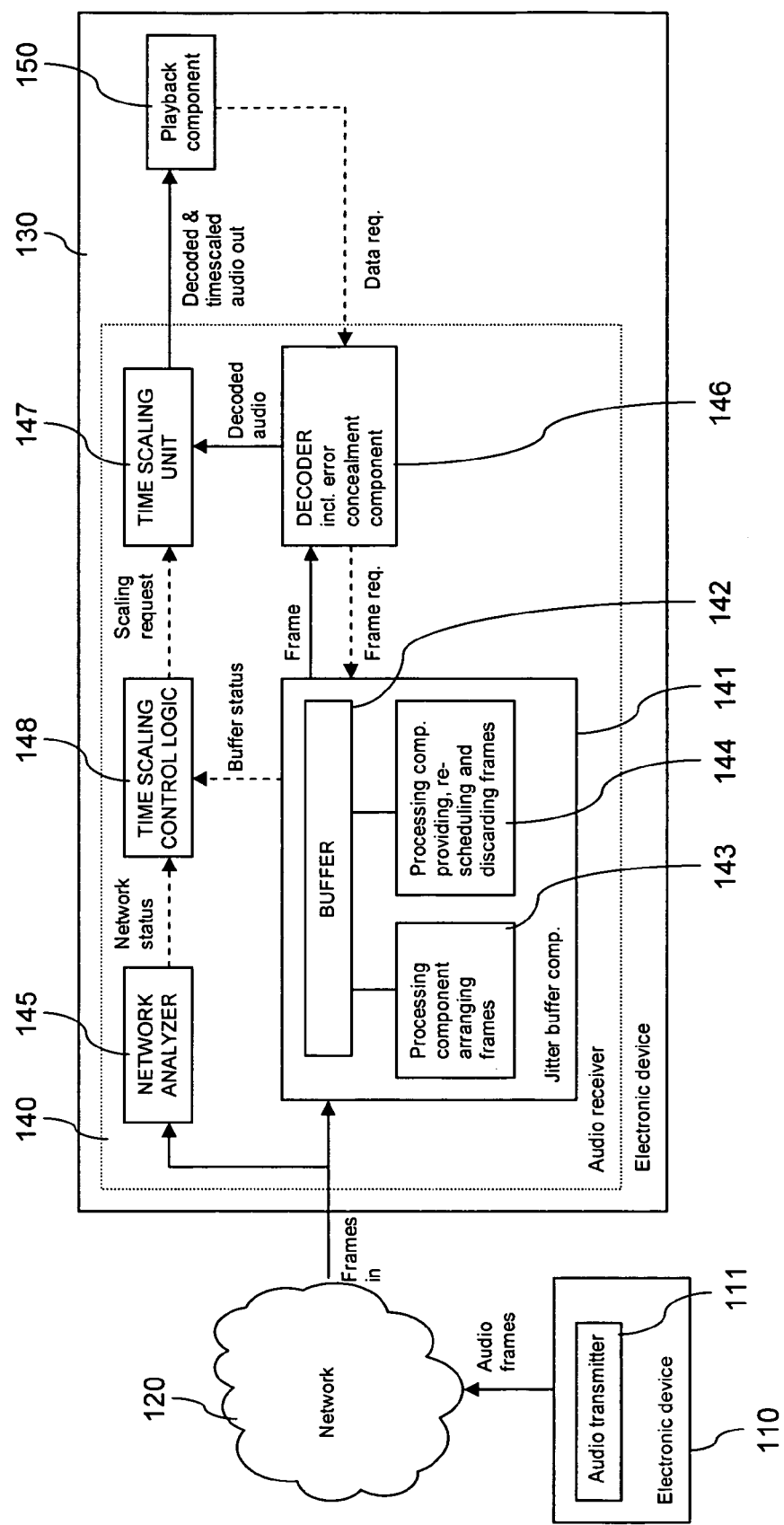
FIG. 1 is a schematic block diagram of a system according to an embodiment of the invention.

FIG. 1 is a schematic block diagram of an exemplary system, which enables a handling of audio frames arriving too late for a normal decoding in accordance with an embodiment of the invention.

The system comprises an electronic device 110 with an audio transmitter 111, a packet switched communication network 120 and an electronic device 130 with an audio receiver 140. It is to be understood that the electronic device 110 may equally comprise a corresponding audio receiver 140 and that the electronic device 130 may equally comprise a corresponding audio transmitter 111. The packet switched communication network 120 can be or comprise for example the Internet, and it can be accessed by both electronic devices 110, 130.

The input of the audio receiver 140 of electronic device 130 is connected within the audio receiver 140 on the one hand to a jitter buffer component 141 and on the other hand to a network analyzer 145. The jitter buffer component 141 comprises in addition to the actual jitter buffer 142 a processing component 143 for arranging frames and a processing component 144 for providing, re-scheduling and discarding frames. Both processing components 143, 144 are linked to the jitter buffer 142. The jitter buffer component 141 is connected via a decoder 146 and a time scaling unit 147 to the output of the audio receiver 140. A control signal output of the network analyzer 145 is connected to a first control input of a time scaling control logic 148, while a control signal output of the jitter buffer component 141 is connected to a second control input of the time scaling control logic 148. A control signal output of the time scaling control logic 148 is further connected to a control input of the time scaling unit 147.

The output of the audio receiver 140 may be connected to a playback component 150 of electronic device 130, for example to earphones or loudspeakers.

Electronic device 130 can be considered to represent an exemplary embodiment of an electronic device according to the invention. Audio receiver 140, or a component thereof including processing component 144, can be considered to represent an exemplary embodiment of an apparatus of the invention.

It is to be understood that various additional components of electronic device 130 within and outside of the audio receiver 140 are not depicted, and that any indicated link could equally be a link via further components not shown. An example for a component not shown is an interface of electronic device 130 enabling the access to the packet switched network 120.

When a speech signal is to be transmitted from electronic device 110 to electronic device 130, for instance in the scope of a VoIP session, the audio transmitter 111 encodes and packetizes audio frames and transmits the resulting packets via the packet switched communication network 120 to the audio receiver 140. The audio frames may be generated from sound captured by a microphone of electronic device 110. They may be partly active speech frames and partly SID frames. The SID frames comprise comfort noise parameters describing the background noise at the electronic device 110 while no active speech is present. In the AMR speech codec and the AMR-WB speech codec, for example, speech frames are generated in 20 ms intervals, while SID frames are generated in 160 ms intervals.

At electronic device 130, the jitter buffer 142 is used to store received and depacketized audio frames while they are waiting for decoding and playback. Processing component 143 takes care that the frames in the buffer 142 are arranged in the correct decoding order. Processing component 144 provides the arranged frames—or information about missing frames—in sequence to the decoder 146 upon request. In addition, the jitter buffer 142 provides information about its status to the time scaling control logic 148. The network analyzer 145 computes a set of parameters describing the current reception characteristics based on frame reception statistics and the timing of received frames and provides the set of parameters to the time scaling control logic 148. Based on the received information, the time scaling control logic 148 determines the need for a changing buffering delay and gives corresponding time scaling commands to the time scaling unit 147. The optimal average buffering delay is the one that minimizes the buffering time without any frames arriving late. With relatively strict buffering delay requirements, however, it is impossible to ensure that no frames arrive after their scheduled decoding time, that is, after they are requested by the decoder 146.

The decoder 146 requests an audio frame from the jitter buffer component 141 whenever new data is requested by the playback component 150. The decoder 146 decodes the retrieved audio frame and forwards the decoded audio frame to the time scaling unit 147. The time scaling unit 147 performs a scaling commanded by the time scaling control logic 148, that is, it may lengthen or shorten the received decoded frames. The decoded and possibly time scaled frames are provided to the playback component 150 for presentation to a user.

The coding and decoding of speech in the system of FIG. 1 may be based on the AMR codec or the AMR-WB codec.

Figure 2:
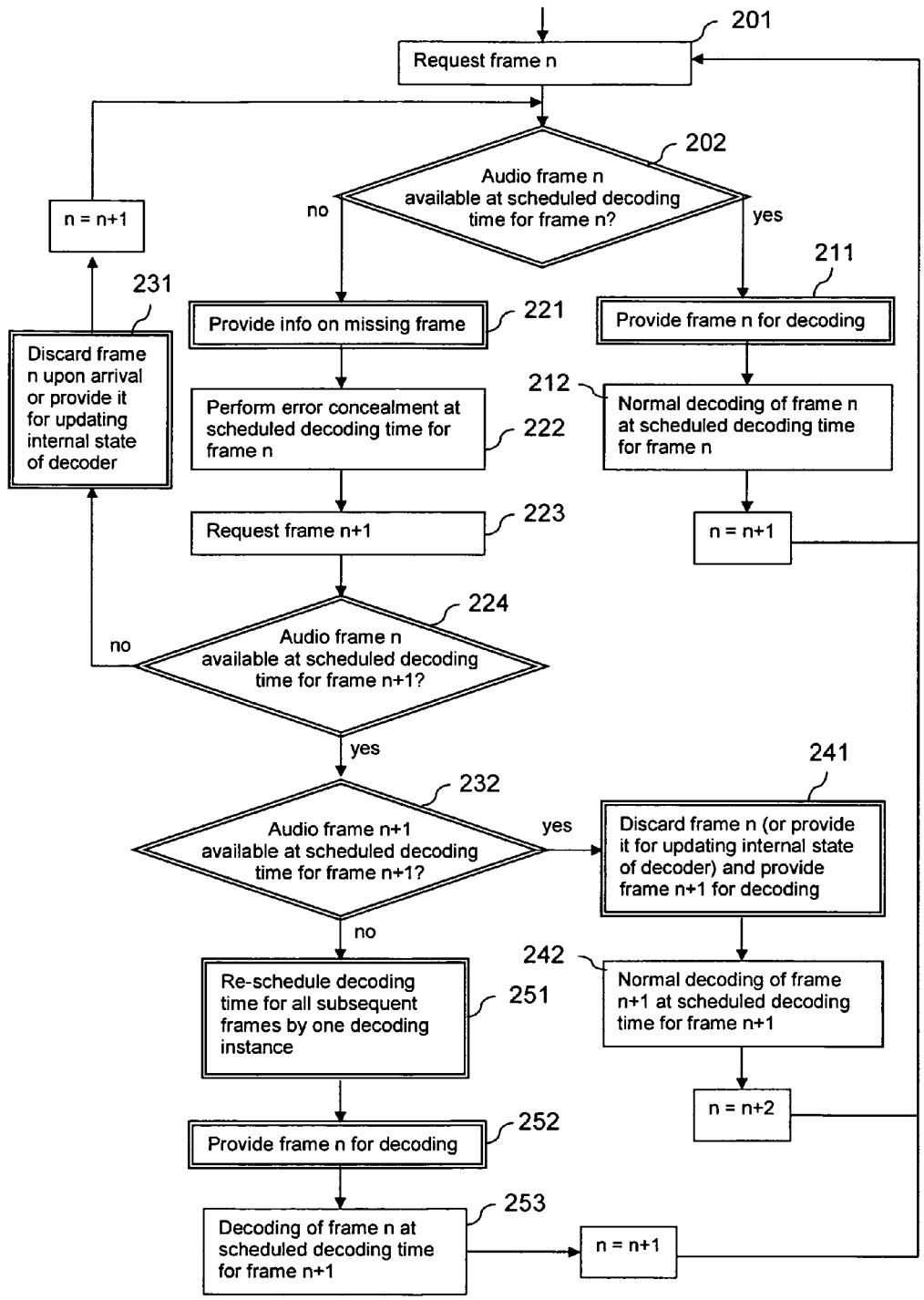
FIG. 2 is a flow chart illustrating an exemplary operation in the system of FIG. 1.

Some aspects of the operation of processing component 144 and decoder 146 will now be described in more detail with reference to the flow chart of FIG. 2. The steps performed by processing component 144 are indicated with double lines, while the steps performed by decoder 146 are indicated with single lines.

When playback component 150 needs new decoded audio data, it informs the decoder 146, which in turn requests a new audio frame n from the jitter buffer component 141 (step 201). The time of this request can be considered to represent the scheduled decoding time for frame n.

In the jitter buffer component 141, the processing component 144 determines whether audio frame n is already available in the jitter buffer 142 (step 202).

If this is the case, the processing component 144 provides frame n to the decoder 146 (step 211), which performs a normal decoding of frame n (step 212). The decoded frame is provided via the time scaling unit 147 to the playback component 150. Then, the decoder 146 waits until further data is requested by the playback component 150, before it requests the next frame n=n+1 from the jitter buffer component 141 (step 201).

If audio frame n is not yet available in the jitter buffer 142 when requested by decoder 146 (step 202), in contrast, the processing component 144 informs the decoder 146 about the missing frame (step 221). The decoder 146 performs there-upon an error concealment (step 222). That is, it creates 20 ms of additional audio data, which is provided instead of the decoded audio frame via the time scaling unit 147 to the playback component 150. In case the AMR codec is used, the error concealment may be based for instance on the example solution provided in document 3GPP TS 26.191 V6.0.0: "Speech codec speech processing functions; Adaptive Multi-Rate—Wideband (AMR-WB) speech codec; Error concealment of erroneous or lost frames (Release 6)", 2004-12. Then, the decoder 146 waits until further data is requested from the playback component 150, before it requests the next frame n+1 from the jitter buffer component 141 (step 223). The time of this next request can be considered to represent the scheduled decoding time for frame n+1.

Upon receipt of the next request (step 223), the processing component 144 checks whether audio frame n is now available at the scheduled decoding time for frame n+1 (step 224).

If this is not the case, processing component 144 continues with step 202 for frame n=n+1. In case the missing frame still arrives at a later time, it may simply be discarded or be provided to the decoder 146 for updating the internal decoder state (step 231).

If audio frame n is available at the scheduled decoding time for frame n+1 (step 224), then the processing component 144 further checks whether audio frame n+1 is available as well at the scheduled decoding time for frame n+1 (step 232). If audio frame n+1 is available, the processing component 144 discards frame n and provides frame n+1 to the decoder 146 (step 241), which performs a normal decoding of frame n+1 (step 242). Alternatively to discarding frame n in step 241, it may also be provided to the decoder 146 for updating the internal decoder state, before the decoder 146 performs a decoding of frame n+1. Then, the decoder 146 waits until further data is requested from the playback component 150, before it requests the next frame n=n+2 from the jitter buffer component 141 (step 201).

If audio frame n+1 is not available at the scheduled decoding time for frame n+1 (step 232), then the processing component 144 re-schedules the decoding time for all subsequent frames by one decoding instance (step 251).

The re-scheduling can be realized in different ways. The most appropriate implementation may depend on the overall implementation of decoder and buffer control. In one approach, the timestamp of the frame n is maintained, and the re-scheduling simply means that this "reference timestamp" is pushed back in time by a value corresponding to one frame. In the case of an implementation, which computes decoding/playback times for frames as they arrive, the re-scheduling may be taken into account when computing the decoding times. In a further alternative approach, the order numbers for the first re-scheduled frame n and all subsequent frames could be re-set. It is to be understood that there are many other feasible approaches for realizing the re-scheduling.

In any case, the processing component 144 provides late arrived frame n to the decoder 146 at the scheduled decoding time for frame n+1 (step 252).

As a result, the decoder 146 performs a normal decoding of frame n instead of frame n+1 at the scheduled decoding time for frame n+1 (step 253). Then, the decoder 146 waits until further data is requested from the playback component 150, before it requests the next frame n=n+1 from the jitter buffer component 141 (step 201).

The embodiment can thus be summarized as follows: If a frame n arrives late, that is, after its scheduled decoding time, it is replaced by a normal error concealment operation. If frame n has been replaced by error concealment AND it arrives before the decoding time of the next frame n+1 AND frame n+1 is not arrived before its scheduled decoding time (i.e. it is also "late"), the playback timeline is modified by re-scheduling frame n for decoding. This means that the standard error concealment was used to create 20 ms of additional signal between frames n−1 and n. If frame n was replaced by error concealment AND it arrives before the decoding time of the next frame n+1 BUT also frame n+1 arrives in time for decoding, frame n is considered either as an outlier in terms of transmission delay or a frame lost in the link, and a re-scheduling is NOT performed.

The presented embodiment thus allows dealing with late arriving frames in a simple manner using a standard AMR or AMR-WB decoder without any modifications.

The functional blocks of the audio receiver 140 presented in FIG. 1 could be implemented in hardware, for instance as circuitry on a chip or chipset. The entire receiver 140 could be realized for example as an integrated circuit (IC). Alternatively, the functions could also be implemented partly or entirely by a computer program code.

Figure 3:
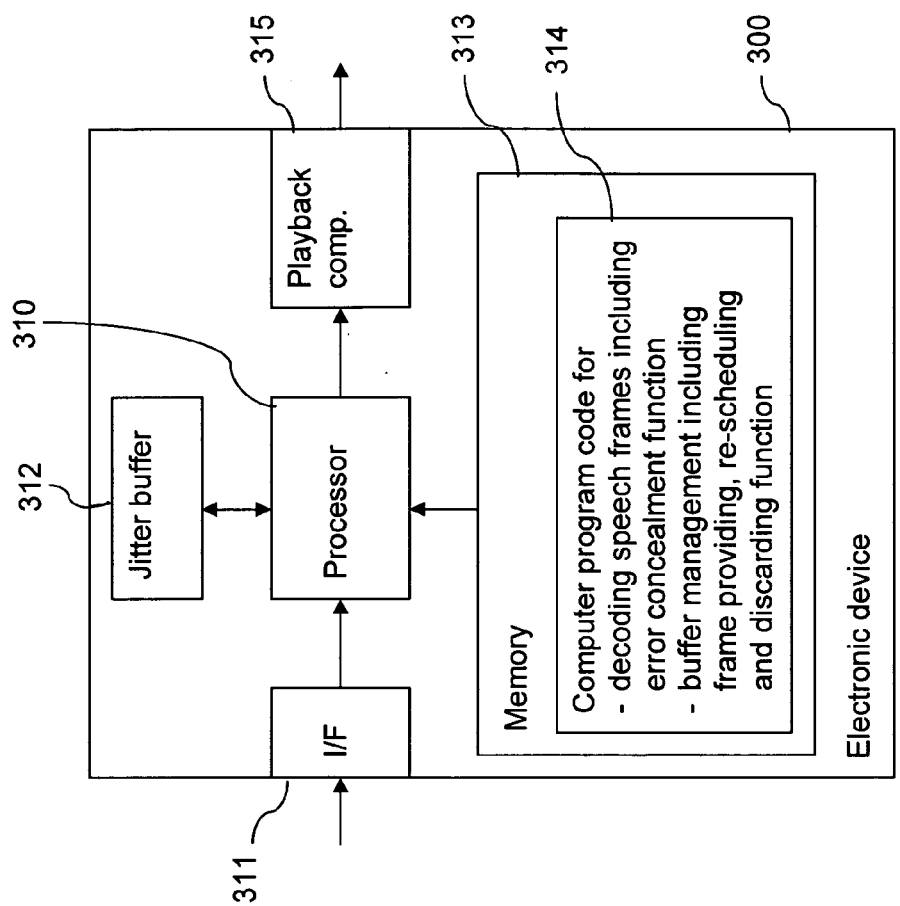
FIG. 3 is a schematic block diagram of an electronic device according to an embodiment of the invention.

FIG. 3 is a block diagram presenting details of a further exemplary implementation of an electronic device 300 according to an embodiment of the invention, which could replace device 130 in the system of FIG. 1 and in which some functions are implemented by means a computer program code.

The electronic device 300 may comprise in this case a processor 310 and, linked to this processor 310, an interface (I/F) 311, a jitter buffer 312, a memory 313 and a playback component 315 including for example an interface to speakers.

The interface 311 enables an access to a packet switched communication network, for example for receiving audio frames of a VoIP connection to another electronic device.

The jitter buffer 312 stores audio frames that are received via the interface 311 under control of the processor 310.

The processor 310 is configured to execute available computer program code.

The memory 313 stores computer program code. The stored code comprises computer program code 314 for decoding speech frames, including error concealment functions, and for managing the jitter buffer 312, including a function for providing, re-scheduling and discarding frames. The decoding may be based again on the AMR codec or the AMR-WB codec.

The processor 310 may retrieve this computer program code 314 from the memory 313 whenever a VoIP session has been established, and execute the code 314 for decoding frames that are to be presented to a user via playback component 315.

For a particularly simple implementation, which is different from the implementation of electronic device 130 presented in FIG. 1, the decoding may be designed to use a fixed decoding rate. Thus, the functions of network analyzer, time scaling control logic and time scaling unit of electronic device 130 of FIG. 1 are not required.

Electronic device 300 can be considered to represent an exemplary embodiment of an electronic device according to the invention. The processor 310 executing the stored computer program code 314 can be considered to represent an exemplary embodiment of an apparatus of the invention.

The processor 310 depacketizes arriving packets and buffers the included frames in the correct order in the jitter buffer 312. Further, the processor 310 takes care of retrieving frames at regular intervals from the jitter buffer 312 and of decoding the retrieved frames. The decoded audio frames may then be forwarded to the playback component 315 for presentation to a user without time-scaling.

For dealing with late arriving frames in accordance with an embodiment of the invention, the processor 310 may perform the functions described with reference to FIG. 2.

It is to be understood that the same processor 310 could execute in addition computer program codes realizing other functions of the electronic device 300.

It is further to be understood that the exemplary architectures of the electronic devices 130, 300 presented in FIGS. 1 and 3 are only intended to illustrate the basic logical functionality of a jitter buffer management according to the invention. In a practical implementation, the represented functions can be allocated differently to processing blocks.

While described embodiments of the invention can be considered as support of the AMR codec or the AMR-WB codec, it is further to be understood that the invention can be employed with various other speech codecs as well.

The functions illustrated by the processing component 144 or by the processor 310 executing program code 314 can also be viewed as means for detecting whether a particular encoded frame, which belongs to a sequence of frames and which has been received via a packet switched network, has been received after a scheduled decoding time for the particular encoded frame and before a scheduled decoding time for a next encoded frame in the sequence of frames; and as means for re-scheduling the particular encoded frame to be decoded at the scheduled decoding time for the next encoded frame, in case the particular encoded frame is detected to have been received after its scheduled decoding time and before the scheduled decoding time for the next encoded frame.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
    a processor detecting whether a particular encoded frame, which belongs to a sequence of frames and which has been received via a packet switched network, has been received after a scheduled decoding time for said particular encoded frame and before a scheduled decoding time for a next encoded frame in said sequence of frames; and
    in case said particular encoded frame is detected to have been received after its scheduled decoding time and before said scheduled decoding time for said next encoded frame, said processor re-scheduling said particular encoded frame to be decoded at said scheduled decoding time for said next encoded frame, wherein said particular encoded frame is re-scheduled only, in case said next encoded frame is detected not to have been received before said scheduled decoding time for said next encoded frame, and wherein otherwise, said particular encoded frame is either discarded without decoding or used for updating an internal state of a decoder.

2. The method according to claim 1, further comprising said processor setting back a scheduled decoding time for all subsequently received encoded frames of said sequence of frames by one decoding instance.

3. The method according to claim 1, further comprising said processor replacing content of said particular encoded frame by an error concealment operation at said scheduled decoding time for said particular encoded frame, in case said particular encoded frame is detected to have been received after said scheduled decoding time for said particular encoded frame.

4. The method according to claim 1, further comprising said processor discarding said particular encoded frame without decoding, in case it is detected that said particular encoded frame has been received after said scheduled decoding time for said particular encoded frame and after said scheduled decoding time for said next encoded frame.

5. The method according to claim 1, further comprising using said particular encoded frame for updating an internal state of a decoder, in case it is detected that said particular encoded frame has been received after said scheduled decoding time for said particular encoded frame and after said scheduled decoding time for said next encoded frame.

6. The method according to claim 1, wherein in case said next encoded frame is detected to have been received before said scheduled decoding time for said next encoded frame, said particular encoded frame is either discarded without decoding or used for updating an internal state of a decoder.

7. The method according to claim 1, further comprising said processor buffering received encoded frames in a jitter buffer at least until their scheduled decoding time, wherein said scheduled decoding times are fixed.

8. The method according to claim 1, further comprising said processor buffering received encoded frames in a jitter buffer at least until their scheduled decoding time, wherein said scheduled decoding times are adaptive.

9. The method according to claim 1, wherein said encoded frames are encoded audio frames.

10. An apparatus comprising a processor,
    said processor being configured to detect whether a particular encoded frame, which belongs to a sequence of frames and which has been received via a packet switched network, has been received after a scheduled decoding time for said particular encoded frame and before a scheduled decoding time for a next encoded frame in said sequence of frames; and
    said processor being configured to re-schedule said particular encoded frame to be decoded at said scheduled decoding time for said next encoded frame, in case said particular encoded frame is detected to have been received after its scheduled decoding time and before said scheduled decoding time for said next encoded frame, wherein said processor is further configured to re-schedule said particular encoded frame only, in case said next encoded frame is detected not to have been received before said scheduled decoding time for said next encoded frame.

11. The apparatus according to claim 10, wherein said processor is further configured to set back a scheduled decoding time for all subsequently received encoded frames of said sequence of frames by one decoding instance.

12. The apparatus according to claim 10, further comprising a decoding component, said decoding component being configured to replace content of said particular encoded frame by an error concealment operation at said scheduled decoding time for said particular encoded frame, in case said particular encoded frame is detected by said processor to have been received after said scheduled decoding time for said particular encoded frame.

13. The apparatus according to claim 10, wherein said processor is further configured to discard said particular encoded frame without decoding, in case it is detected that said particular encoded frame has been received after said scheduled decoding time for said particular encoded frame and after said scheduled decoding time for said next encoded frame.

14. The apparatus according to claim 10, wherein said processor is further configured to provide said particular encoded frame for updating an internal state of a decoder, in case it is detected that said particular encoded frame has been received after said scheduled decoding time for said particular encoded frame and after said scheduled decoding time for said next encoded frame.

15. The apparatus according to claim 10, wherein in case said next encoded frame is detected to have been received before said scheduled decoding time for said next encoded frame, said processor is further configured to either discard said particular encoded frame without decoding or provide said particular encoded frame for updating an internal state of a decoder.

16. The apparatus according to claim 10, further comprising a jitter buffer configured to buffer received encoded frames at least until their scheduled decoding time, wherein said scheduled decoding times are fixed.

17. The apparatus according to claim 10, further comprising a jitter buffer configured to buffer received encoded frames at least until their scheduled decoding time, wherein said scheduled decoding times are adaptive.

18. The apparatus according to claim 10, wherein said encoded frames are encoded audio frames.

19. An electronic device comprising:
an apparatus according to claim 10; and
a user interface.

20. A system comprising:
an apparatus according to claim 10; and
an apparatus comprising a processor configured to provide a sequence of encoded frames for transmission via a packet switched network.

21. A non-transitory computer readable medium in which a program code is stored, said program code realizing the following when executed by a processor:
detecting whether a particular encoded frame, which belongs to a sequence of frames and which has been received via a packet switched network, has been received after a scheduled decoding time for said particular encoded frame and before a scheduled decoding time for a next encoded frame in said sequence of frames; and
in case said particular encoded frame is detected to have been received after its scheduled decoding time and before said scheduled decoding time for said next encoded frame, re-scheduling said particular encoded frame to be decoded at said scheduled decoding time for said next encoded frame.

22. The non-transitory computer readable medium according to claim 21, wherein said program code further realizes the following: setting back a scheduled decoding time for all subsequently received encoded frames of said sequence of frames by one decoding instance.

23. The non-transitory computer readable medium according to claim 21, wherein said program code further realizes the following: replacing content of said particular encoded frame by an error concealment operation at said scheduled decoding time for said particular encoded frame in case said particular encoded frame is detected to have been received after said scheduled decoding time for said particular encoded frame.

24. The non-transitory computer readable medium according to claim 21, wherein said program code further realizes the following: discarding said particular encoded frame without decoding, in case it is detected that said particular encoded frame has been received after said scheduled decoding time for said particular encoded frame and after said scheduled decoding time for said next encoded frame.

25. The non-transitory computer readable medium according to claim 21, wherein said program code further realizes the following: using said particular encoded frame for updating an internal state of a decoder, in case it is detected that said particular encoded frame has been received after said scheduled decoding time for said particular encoded frame and after said scheduled decoding time for said next encoded frame.

26. The non-transitory computer readable medium according to claim 21, wherein in case said next encoded frame is detected to have been received before said scheduled decoding time for said next encoded frame, either discarding said particular encoded frame without decoding or using said particular encoded frame for updating an internal state of a decoder.

27. The non-transitory computer readable medium according to claim 21, wherein said program code further realizes the following: buffering received encoded frames in a jitter buffer at least until their scheduled decoding time, wherein said scheduled decoding times are fixed.

28. The non-transitory computer readable medium according to claim 21, wherein said program code further realizes the following: buffering received encoded frames in a jitter buffer at least until their scheduled decoding time, wherein said scheduled decoding times are adaptive. pg,29

29. The non-transitory computer readable medium according to claim 21, wherein said encoded frames are encoded audio frames.

30. An apparatus comprising:
means for detecting whether a particular encoded frame, which belongs to a sequence of frames and which has been received via a packet switched network, has been received after a scheduled decoding time for said particular encoded frame and before a scheduled decoding time for a next encoded frame in said sequence of frames; and
means for re-scheduling said particular encoded frame to be decoded at said scheduled decoding time for said next encoded frame, in case said particular encoded frame is detected to have been received after its scheduled decoding time and before said scheduled decoding time for said next encoded frame, wherein in case said next encoded frame is detected to have been received before said scheduled decoding time for said next encoded frame, said particular encoded frame is either discarded without decoding or used for updating an internal state of a decoder.

31. A method comprising:
a processor detecting whether a particular encoded frame, which belongs to a sequence of frames, has arrived before its scheduled decoding time; and
in case said particular encoded frame has been detected not to have arrived before its scheduled decoding time, if a previous frame in said sequence of frames has been replaced by error concealment and said previous frame arrives before said scheduled decoding time of particular encoded frame, said processor modifying a playback timeline by re-scheduling the previous frame for decoding, wherein said particular encoded frame is re-scheduled only, in case said next encoded frame is detected not to have been received before said scheduled decoding time for said next encoded frame.

* * * * *

UNITED STATES PATENT AND TRADEMARK OFFICE
CERTIFICATE OF CORRECTION

| | | |
|---|---|---|
| PATENT NO. | : 7,796,626 B2 | Page 1 of 1 |
| APPLICATION NO. | : 11/528488 | |
| DATED | : September 14, 2010 | |
| INVENTOR(S) | : Ari Lakaniemi et al. | |

It is certified that error appears in the above-identified patent and that said Letters Patent is hereby corrected as shown below:

In column 12, line 28, which is claim 28, line 5 "pg,29" should be deleted.

Signed and Sealed this
Nineteenth Day of April, 2011

David J. Kappos
*Director of the United States Patent and Trademark Office*